(12) United States Patent
Burtscher et al.

(10) Patent No.: US 10,974,330 B2
(45) Date of Patent: Apr. 13, 2021

(54) CUTTING INSERT

(71) Applicant: CERATIZIT AUSTRIA GESELLSCHAFT M.B.H., Reutte (AT)

(72) Inventors: Peter Burtscher, Haeselgehr (AT); Josef Prast, Pflach (AT)

(73) Assignee: Ceratizit Austria Gesellschaft m.b.H., Reutte (AT)

( * ) Notice: Subject to any disclaimer, the term of this patent is extended or adjusted under 35 U.S.C. 154(b) by 0 days.

(21) Appl. No.: 16/080,747

(22) PCT Filed: Feb. 22, 2017

(86) PCT No.: PCT/AT2017/000009
§ 371 (c)(1),
(2) Date: Aug. 29, 2018

(87) PCT Pub. No.: WO2017/147630
PCT Pub. Date: Sep. 8, 2017

(65) Prior Publication Data
US 2019/0030627 A1   Jan. 31, 2019

(30) Foreign Application Priority Data
Feb. 29, 2016   (AT) .................................. GM42/2016

(51) Int. Cl.
*B23C 5/20*   (2006.01)
*B23C 5/06*   (2006.01)
*B29C 33/00*  (2006.01)

(52) U.S. Cl.
CPC ................ *B23C 5/06* (2013.01); *B23C 5/207* (2013.01); *B29C 33/0038* (2013.01);
(Continued)

(58) Field of Classification Search
CPC .......... B23C 2200/08; B23C 2200/083; B23C 2200/12; B23C 2200/123;
(Continued)

(56) References Cited

U.S. PATENT DOCUMENTS 3,786,540 A * 1/1974 Lundgren ............. B23B 27/143
                                                    407/113
4,294,565 A * 10/1981 Erkfritz ................... B23C 5/207
                                                    407/113
(Continued)

FOREIGN PATENT DOCUMENTS

AT            001430 U1    5/1997
AT            12004 U1     9/2011
(Continued)

*Primary Examiner* — Alan Snyder
(74) *Attorney, Agent, or Firm* — Laurence A. Greenberg; Werner H. Stemer; Ralph E. Locher

(57) ABSTRACT

A cutting insert has a substantially triangular or square basic shape with a top surface and a base surface that are connected together by lateral flanks. A cutting edge is formed at the transition between at least one flank and the top surface. The cutting edge extends between cutting corners, and the cutting edge has a portion that is convex in side view of a flank. The convex portion of the cutting edge is bounded on both sides by concavely curved portions.

9 Claims, 5 Drawing Sheets

(52) U.S. Cl.
CPC ............... *B23C 2200/0461* (2013.01); *B23C 2200/0483* (2013.01); *B23C 2200/203* (2013.01); *B23C 2200/208* (2013.01)

(58) Field of Classification Search
CPC .... B23C 2200/0455; B23C 2200/0461; B23C 2200/203
See application file for complete search history.

(56) References Cited

U.S. PATENT DOCUMENTS

| | | | | |
|---|---|---|---|---|
| 4,919,573 A | * | 4/1990 | Tsujimura | B23C 5/2221 407/103 |
| 5,203,649 A | * | 4/1993 | Katbi | B23B 27/143 407/114 |
| 8,905,685 B2 | | 12/2014 | Horiike et al. | |
| 8,974,156 B2 | | 3/2015 | Burtscher | |
| 9,028,177 B2 | | 5/2015 | Horiike et al. | |
| 10,406,610 B2 | * | 9/2019 | Ishi | B23C 5/207 |
| 2006/0073744 A1 | * | 4/2006 | Jonsson | B23B 31/11 439/884 |
| 2010/0047026 A1 | * | 2/2010 | Horiike | B23C 5/109 407/40 |
| 2010/0202839 A1 | * | 8/2010 | Fang | B23C 5/109 407/53 |
| 2013/0223942 A1 | * | 8/2013 | Matsuo | B23C 5/109 407/42 |
| 2014/0334890 A1 | * | 11/2014 | Takahashi | B23C 5/109 407/114 |
| 2016/0144438 A1 | * | 5/2016 | Yamamichi | B23C 5/06 409/131 |
| 2016/0158854 A1 | * | 6/2016 | Ishi | B23C 5/207 409/131 |
| 2017/0066065 A1 | * | 3/2017 | Burtscher | B23C 5/207 |

FOREIGN PATENT DOCUMENTS

| | | | | |
|---|---|---|---|---|
| CN | 101511514 A | | 8/2009 | |
| EP | 0462954 A2 | * | 12/1991 | ........... B23C 5/2221 |
| EP | 0536669 A1 | | 4/1993 | |
| EP | 2060352 A1 | | 5/2009 | |
| JP | 2015100901 A | | 6/2015 | |
| WO | WO-2008120186 A1 | * | 10/2008 | ........... B23C 5/2213 |
| WO | 2014208513 A1 | | 12/2013 | |
| WO | WO-2014081011 A1 | * | 5/2014 | ............ B23C 5/202 |

* cited by examiner

CUTTING INSERT

BACKGROUND OF THE INVENTION

Field of the Invention

The invention relates to a cutting insert having a substantially triangular or square basic shape with a top surface and a base surface which are connected together by lateral flanks. At the transition of at least one flank to the top surface, a cutting edge is formed. The cutting edge extends between cutting corners, and the cutting edge has a portion that is convex in side view of a flank.

Cutting inserts of the type in question are used for what is known as high feed milling, which is milling with relatively shallow depths of cut and high feed rates.

In high feed milling, work is done at high feed rates and shallow cutting depths, for example in order to machine flat faces as efficiently as possible.

The cutting inserts are typically triangular or square indexable cutting inserts.

AT 12004 U1 discloses a cutting insert of the type in question, having a substantially triangular or square basic shape with a top surface and a base surface which are connected together by lateral flanks, wherein three or, respectively, four cutting edges, which are convexly curved toward the outside, are formed in each case by the intersection between the top surface and/or base surface and the flanks, said cutting edges each consisting at least of a circular arc and at least one substantially straight portion and being connected together via cutting corners having a corner radius.

SUMMARY OF THE INVENTION

The object of the present invention is to specify an improved cutting insert.

This object is achieved by a cutting insert as claimed. Preferred embodiments are specified in the dependent claims.

Since the convex portion of the cutting edge is bounded on both sides by concavely curved portions, a much gentler cut is achieved than with cutting inserts known from the prior art.

This is explained by the greater contact length of the cutting edge compared with known cutting inserts. In the context of the present invention, the contact length means the length of the cutting edge that is actually in engagement with a workpiece. As a result of the design with a convex portion and adjoining concave portions, the contact length is increased compared with a for example straight cutting edge. An increased contact length has the effect that, at given external dimensions of a cutting insert, locally lower cutting forces act and a longer section is available for heat dissipation.

Moreover, the design according to the invention of the cutting edge allows a peeling cut substantially along the entire length of the cutting edge in engagement with the material to be machined. The expression peeling cut is used when the cutting edge is not normal to the direction of movement. A peeling cut is associated with a gentler buildup of cutting force and lower cutting forces.

The convex portion located at the front in the direction of movement of the cutting insert acts like a plow and creates a peeling cut. The adjoining concave portions form the chip in a particularly advantageous manner with regard to the cutting forces:

Tests by the applicant have shown that an edge formed in such a way creates a chip which preserves a substantially elongate form, i.e. does not roll up counter to the direction of movement of the cutting insert. The forces necessary for rolling up the chip contribute toward increased loading of the cutting edge. Therefore, since the chip maintains its substantially elongate form, the force acting on the cutting edge is reduced, and the tool life of the cutting insert is increased.

The indications "convex" and "concave" refer here to the appearance of the contour of the cutting edges in side view of a side surface. The convex portion is thus curved upwardly and outwardly with regard to the cutting insert.

The cutting insert can have a substantially triangular or square basic shape. Preference is given to the square shape, since the cutting insert can in this case be embodied with fourfold indexability.

Provision is preferably made for the concavely curved portions to extend as far as the respectively adjacent cutting corners. In other words, the cutting edge has a continuous curvature.

Provision is preferably made for the transitions from the convex portion into the first concave portion and from the convex portion into the second concave portion to be formed in each case in a tangential manner.

Provision is preferably made for cutting edges to be formed at all transitions from flanks to the top surface. Thus, in the case of a square cutting insert, four independent cutting edges are available, and in the case of a triangular cutting insert, three independent cutting edges are available. In the first case, a cutting insert having fourfold indexability is referred to and in the case of a triangular cutting insert, a cutting insert having threefold indexability is referred to. For reasons of material utilization, efforts are made to form cutting edges at all transitions from flanks to the top surface.

Provision is preferably made for the convexly curved portion to be located eccentrically between two cutting corners. Thus, on viewing a cutting edge, the vertex of the convex portion is not located in the middle of the cutting edge. Rather, the vertex of the convexly curved portion is shifted in the direction of that cutting corner that is located radially on the inside with regard to a trajectory of the cutting insert when the cutting insert is used, or, with regard to a tool holder, is located radially on the inside with regard to the tool holder. In this way, when the cutting tool is used, the convexly curved portion passes, as the first portion of the cutting edge, into a material to be machined.

Provision is preferably made for a radius of curvature of a concavely curved portion to amount to three to six times the radius of curvature of the convexly curved portion. The concave portions thus preferably have a smaller curvature than the convex portion.

Provision is preferably made for the cutting edges to have a profile that is convex in plan view of the top surface. The cutting edges are thus outwardly curved. The profile of the cutting edges is in this case preferably formed by elliptical portions.

Protection is also desired for an arrangement of at least one cutting insert in a tool holder.

The invention is explained in more detail in the following text by the figures.

DESCRIPTION OF THE INVENTION

Figure 1:
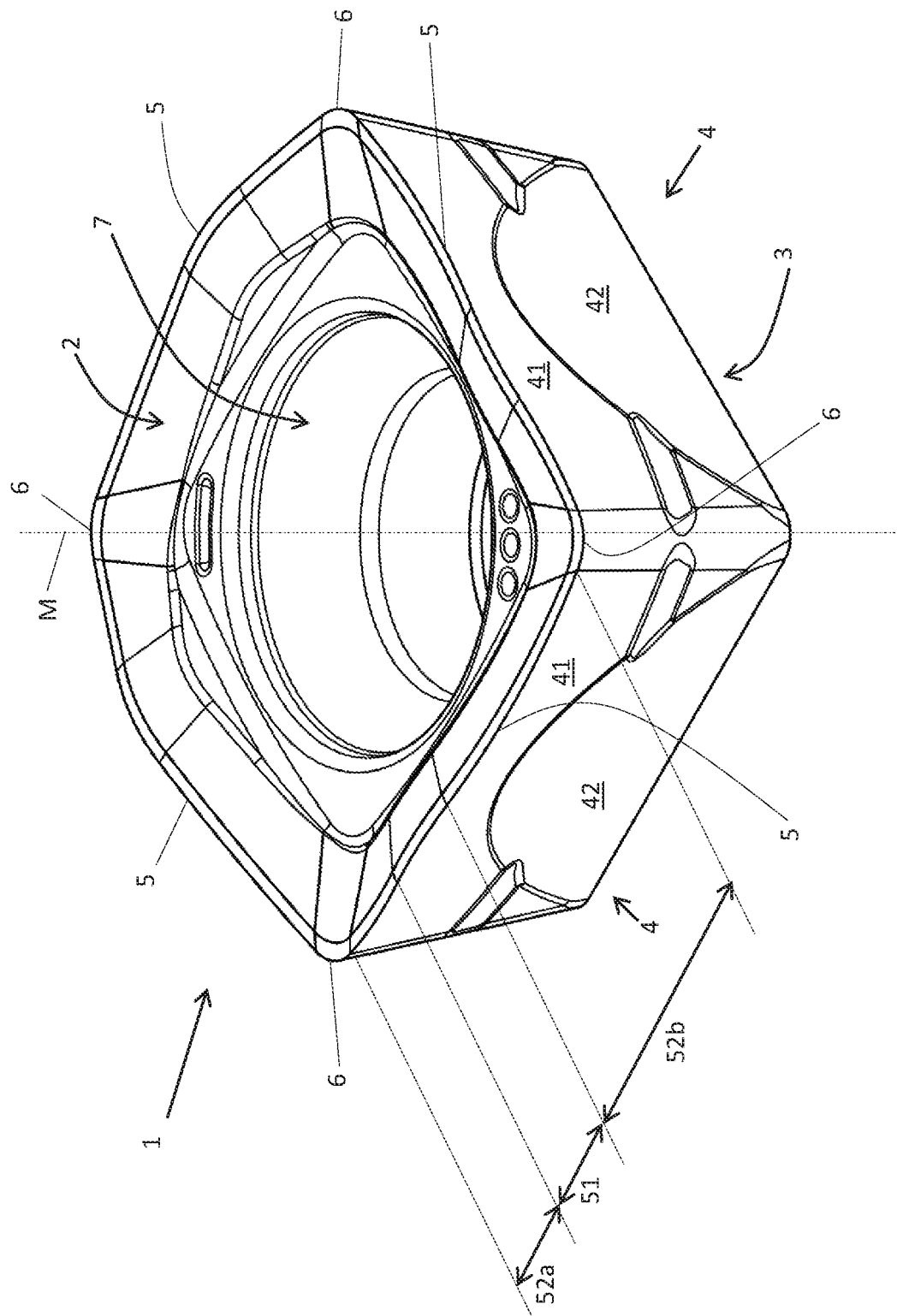
FIG. 1 shows a cutting insert according to the invention in a perspective view

FIG. 1 shows a cutting insert 1 according to the invention in a perspective view. The cutting insert 1 is configured to mill at high feed rates, referred to as high feed milling. A characteristic for milling at high feed rates is a shallow cutting depth and a high feed rate. The cutting insert 1 is configured in this exemplary embodiment with a square basic shape (as what is known as an S insert). Alternatively, the cutting insert 1 could be formed with a triangular basic shape (as what is known as a triangular insert, also called a T insert).

The cutting insert 1 has a top surface 2 and a base surface 3, between which side surfaces 4 are located. Formed on at least one side surface 4 is a flank 41, which adjoins the top surface 2. At the transition of a flank 41 to the top surface 2, a cutting edge 5 is formed, which extends between cutting corners 6. The cutting corners 6 are embodied in a rounded manner with a radius of curvature.

Furthermore, formed on a side surface 4 is a bearing surface 42, via which the cutting insert 1 can be positioned in a form-fitting manner in a tool holder (not shown). The cutting insert 1 is symmetric with regard to a central axis M.

Preferably, at the transition of each flank 41 to the top surface 2, a cutting edge 5 is formed. In this way, in the case of the square basic shape, a cutting insert 1 that has fourfold indexability is obtained. Fourfold indexability means that four independent cutting edges 5 can be used for machining. In this case, a new machining position is set by rotating the cutting insert 1 through 90°. Thus, in the case of a square basic shape of the cutting insert, four cutting edges 5 are realized, which are spaced apart by four cutting corners 6.

The cutting insert 1 furthermore has a central bore 7 for receiving a clamping screw, by means of which the cutting insert 1 can be secured to a tool holder (not shown).

The flanks 41 enclose an angle of less than 90° with the top surface 2. The cutting insert 1 narrows from the top surface 2 in the direction of the base surface 3.

A cutting edge 5 has a convex, upwardly curved portion 51. The convex portion 51 merges to the left into a first concave portion 52a and to the right into a second concave portion 52b. The concave portions 52a, 52b each extend from the convex portion 51 to the respectively adjoining cutting corners 6. The directions given relate to a side view of a side surface 4.

Figure 2:
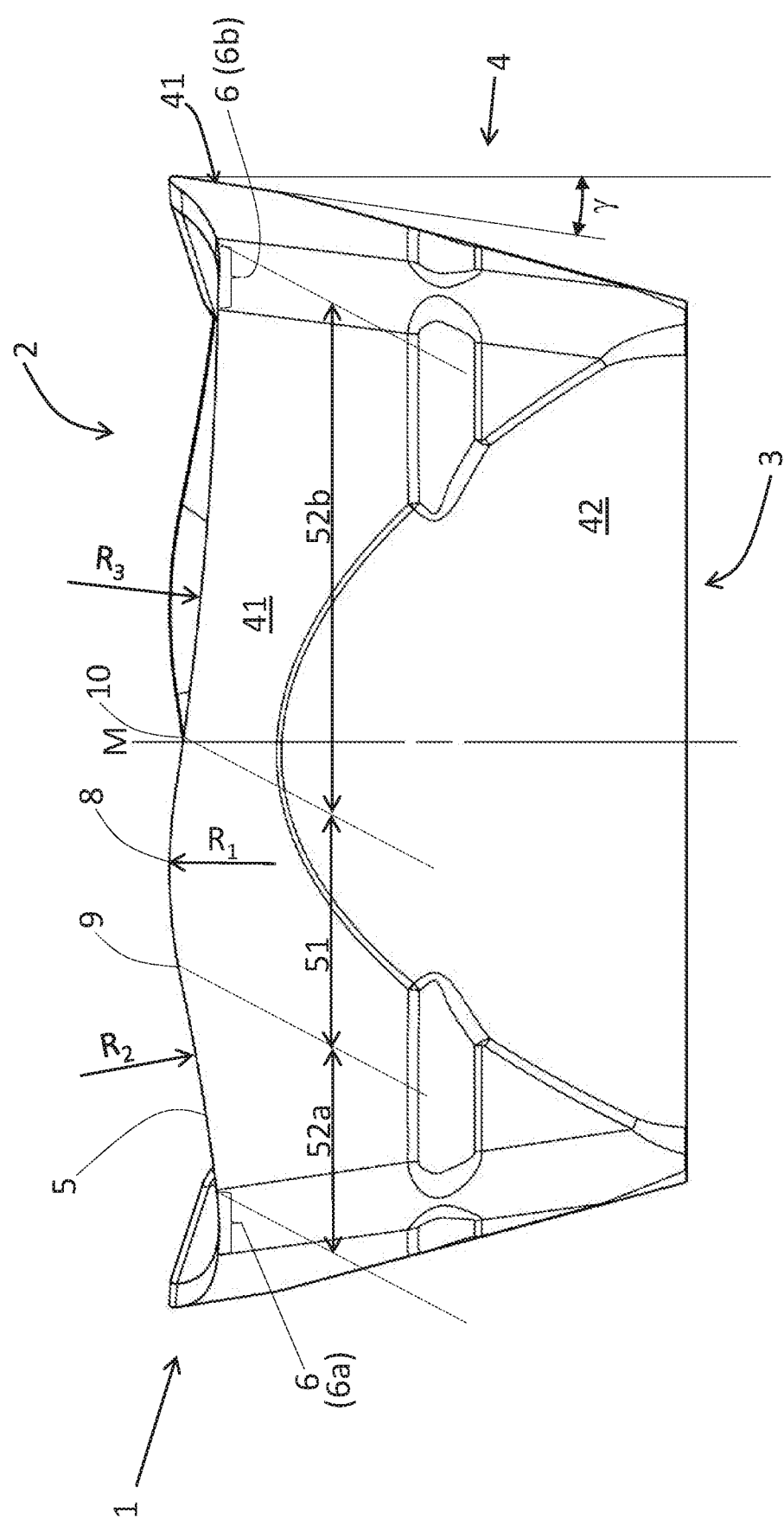
FIG. 2 shows a cutting insert according to the invention in side view

The conditions are even clearer from FIG. 2. FIG. 2 shows a cutting insert 1 according to the invention in side view of a side surface 4.

The cutting edge 5 has a convex portion 51 with a radius of curvature $R_1$. The convex portion 51 is curved upwardly and outwardly with regard to the cutting insert. The convex portion 51 merges to the left, as seen in the viewing direction, at a transition point 9, into a first concave portion 52a having a radius of curvature $R_2$ and to the right, as seen in the viewing direction, at a transition point 10, into a second concave portion 52b having a radius of curvature $R_3$.

The convexly curved portion 51 is preferably located eccentrically between two cutting corners 6. The vertex 8 of the convexly curved portion 51 is in this case shifted in the direction of that cutting corner 6a that is located radially on the inside with regard to a trajectory of the cutting insert 1 when the cutting insert 1 is used.

The transitions from the convex portion 51 into the first concave portion 52a and from the convex portion 51 into the second concave portion 52b are formed in each case in a tangential manner. In other words, the centers of the radii of curvature of the convex portion 51 and of the respective concave portion, and the respective transition points 9, 10 are located on straight lines.

It should be noted that the information given to describe the convexity, the concavity and the transitions relates to a normal projection of the cutting insert 1.

It is in no way necessary for the convex portion 51 and the concave portions 52a, 52b to be described by a single radius of curvature in each case. It is likewise conceivable for the respective contours to have a profile with different curvatures.

In use, the cutting insert 1 is infed with respect to a workpiece (not shown) such that the cutting corner 6a (the left-hand cutting corner 6 in side view) is located closest to the machined workpiece surface. The vertex 8 of the convex portion 51 is shifted, with respect to a central axis M of the cutting insert 1, in the direction of that cutting corner 6a that is located closest to the plane of the machined workpiece surface while the cutting edge 5 in question is being used.

The conditions, outlined above, with regard to the location of the vertex 8 of the convex portion 51 apply to cutting inserts 1 for machining with a tool with right-handed rotation. Were the cutting insert to be provided for use with left-handed rotation, the arrangement would be mirrored, i.e. the vertex 8 of the convex portion 51 would be shifted to the right with respect to a central axis M of the cutting insert 1.

The first concave portion 52a having a radius of curvature $R_2$ extends from the first transition point 9 to that cutting corner 6a that is closest to the machined workpiece surface.

The second concave portion 52b extends from the second transition point 10 to the cutting corner 6b that is located radially on the outside when the cutting insert is used. This cutting corner 6b located radially on the outside is normally not in engagement with the workpiece in high feed milling.

In use, the convex portion 51 projects farthest forward in the direction of movement of the cutting insert 1. When the cutting insert enters the workpiece to be machined, the convex portion 51 enters first and creates a peeling cut like a plow. Subsequently, the length of the cutting edge 5 that is in engagement increases gradually. This brings about a uniform buildup of cutting force and a gentle cut.

The adjoining concave portions 52a, 52b likewise cut in a peeling manner and have the effect that a removed chip does not roll up counter to the direction of movement of the cutting insert, but maintains a substantially elongate form. Since forces are required in order to roll up the chip counter to the direction of movement, when a cutting insert 1 according to the invention is used, lower cutting forces arise than in conventional cutting inserts.

A further explanation for the observed particularly favorable cutting forces is that the concave portions adjoining the convex portion on both sides prevent lateral widening of the chip and thus reduce the cutting forces. Thus, while, in the convex portion, the chip is laterally expanded as in the case of a plow, the concave portions form the chip in a manner counteracting this. Cutting-force-increasing lateral widening or expansion of the chip is avoided or reduced in this way. The particularly favorable action is ascribed to the concave portions.

The flanks 41 are infed at an angle of less than 90° to the top surface 2. In this way, the cutting insert 1 has an insert-specific positive clearance angle γ.

Figure 3:
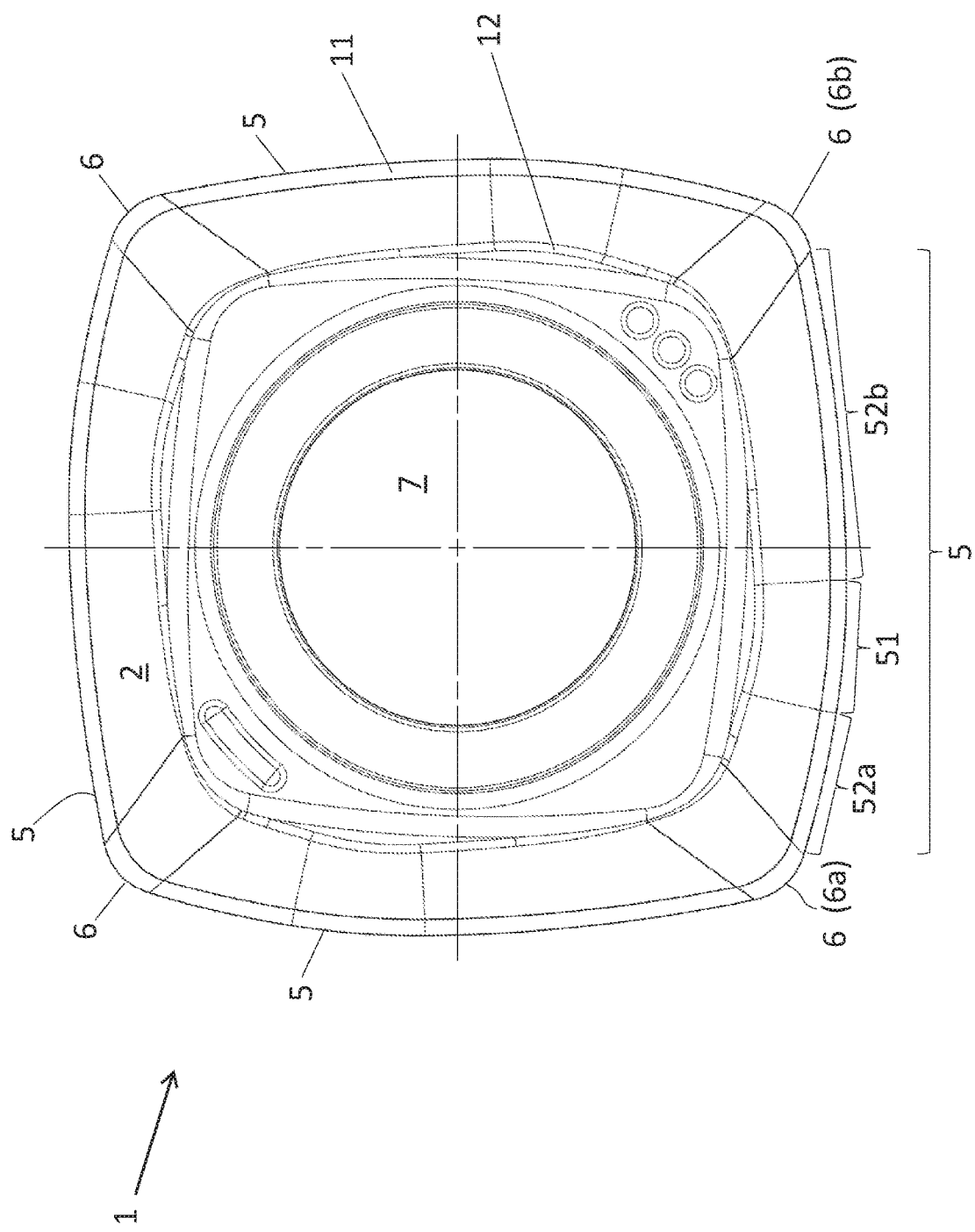
FIG. 3 shows a cutting insert according to the invention in plan view

FIG. 3 shows a cutting insert 1 according to the invention in plan view of the top surface 2. The cutting edges 5 are curved convexly outward and have a locally elliptical contour. Thus, an elliptical portion can be inscribed into the contour of the first concave portion 52a, of the convex portion 51 and of the second concave portion 52b in each case. Alternatively, the curvature can be described by a different curve than an ellipse.

For clarity, it is repeated that the concavity, discussed at the beginning, of the concave portions 52a, 52b and the convexity of the convex portion 51 refer to a side view of a side surface 4. Furthermore, and as shown in the present figure, the concave portions 52a, 52b and the convex portion 51 have, in plan view of the top surface 2, a convex (outwardly bulging) profile. This convex profile can be described by radii of curvature which are normal to the central axis M. Preferably, the contour can be specified by elliptical portions. This information relates to a normal projection onto the top surface 2.

Formed at the transition of the top surface 2 to the cutting edges 5 and to the cutting corners 6, respectively, is a supporting land 11. The supporting land 11 reduces vibrations and the risk of fragments breaking off at cutting edges 5.

Furthermore, a chip geometry 12 is formed on the top surface 2. The chip geometry 12 serves for the controlled removal of a chip taken off by the cutting insert 1.

Figure 4:
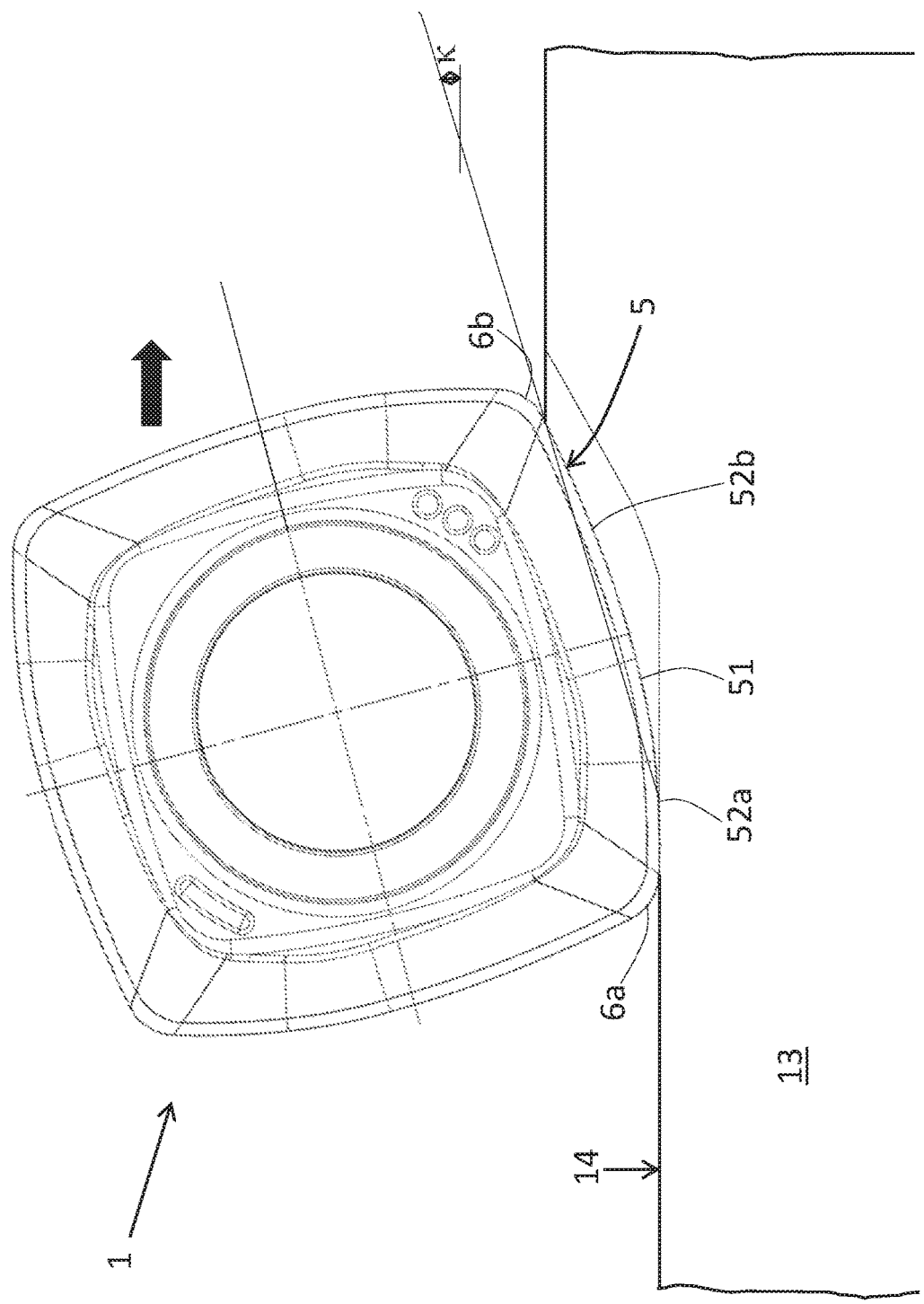
FIG. 4 shows a cutting insert according to the invention in plan view in engagement with a workpiece

FIG. 4 shows a cutting insert 1 according to the invention in engagement with the workpiece 13 to be machined.

A feed direction of the cutting insert 1 is identified via a block arrow. The direction of rotation of the cutting insert 1 is normal to the plane of the drawing and is in the direction of the observer. The dashed auxiliary lines on the workpiece 13 indicate the chip cross section which is removed during the next entry of a cutting insert.

The cutting insert 1 is inclined at a setting angle κ radially to a workpiece surface 14. The setting angle κ is determined between the workpiece surface 14 and the connection of the lowest point of the cutting insert 1 with regard to the workpiece surface 14 and the exit point of the edge 5 from the workpiece 13.

The cutting corner 6a is located in the plane of the workpiece surface 14 after machining and at the rear with regard to the feed direction. With regard to a tool holder (not shown here), the cutting corner 6a is located radially on the inside.

The first concave portion 51a of the cutting edge 5 forms a finishing edge, and the convex portion 51 and the second concave portion 52b form a main edge. The main edge takes on the main material removal, while the finishing edge smooths the surface.

The cutting insert 1 is produced preferably via a powder metallurgical method, typically pressing and sintering. The cutting insert 1 consists preferably of carbide or a cermet.

Figure 5:
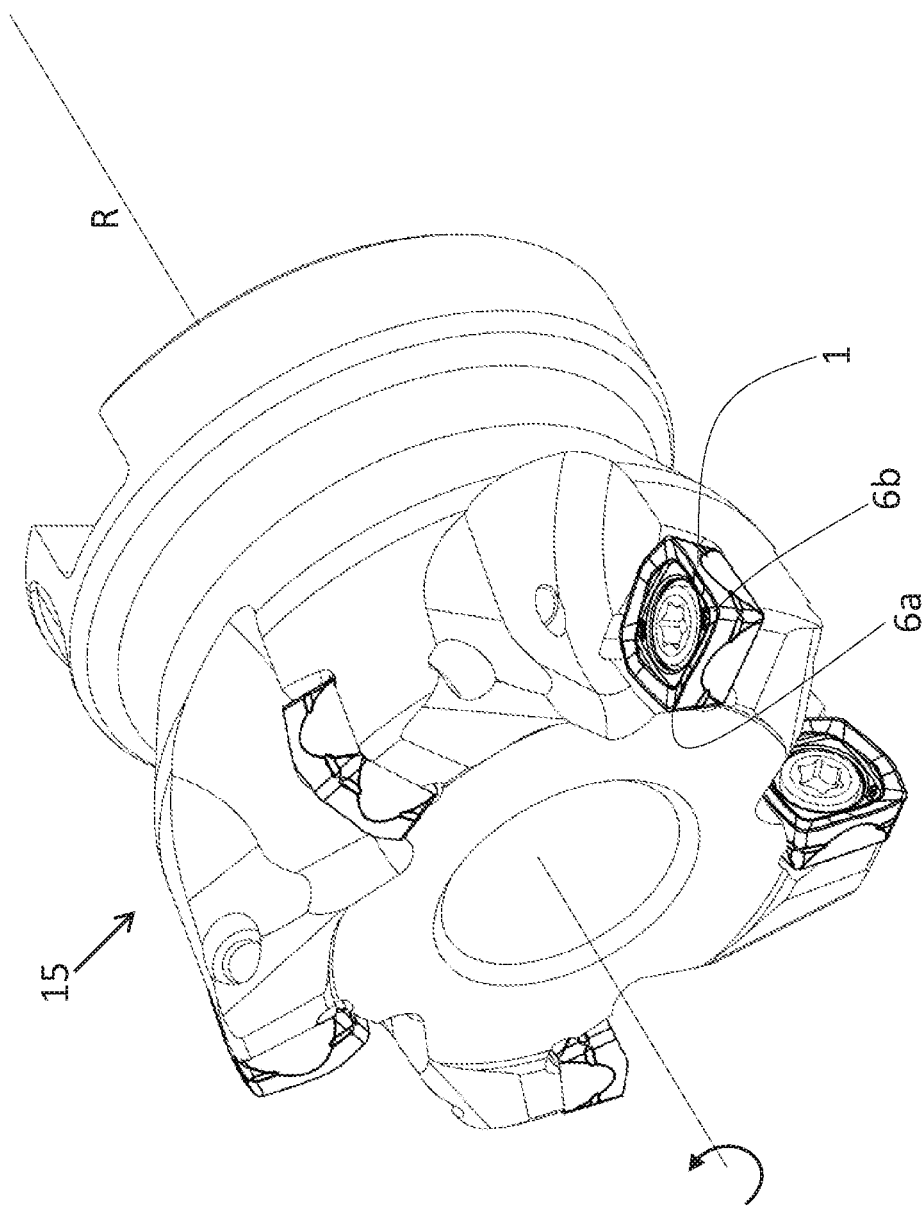
FIG. 5 shows an arrangement of a cutting insert according to the invention and a tool holder

FIG. 5 illustrates the arrangement of cutting inserts 1 embodied according to the invention in a suitable tool holder 15 for face milling at high feed rates. In the present example, five cutting inserts 1 are arranged. It is also possible for more or fewer cutting inserts 1 to be arranged on a tool holder.

The direction of rotation of the tool holder 15 about an axis of rotation R is indicated by an arrow. The cutting inserts 1 are radially clamped.

The cutting insert 1 is arranged on the tool holder 15 such that the convexly curved portion 51 is located radially on the inside with regard to the trajectory of the cutting insert 1. This arrangement ensures that the convexly curved portion 51 enters a workpiece to be machined first.

The arrangement is particularly suitable for milling operations with high feed rates, known as high feed milling. The characteristic of the cutting insert 1 according to the invention together with the arrangement with the tool holder 15 results in a main loading direction in the direction of the axis of rotation R (which is the same as the spindle axis), with the result that particularly high stiffness and precision associated therewith are achieved.

LIST OF REFERENCE SIGNS USED

1 Cutting insert
2 Top surface
3 Base surface
4 Side surface
41 Flank
42 Bearing surface
5 Cutting edge
51 Convex portion of the cutting edge
52a, 52b Concave portions of the cutting edge
6 Cutting corner
7 Bore
8 Vertex
9, 10 Transition point
11 Supporting land
12 Chip geometry
13 Workpiece
14 Workpiece surface
15 Tool holder
γ Clearance angle
κ Setting angle
M Central axis
R Axis of rotation

The invention claimed is:

1. A cutting insert, comprising:
    a substantially triangular or square basic shape with a top surface, a base surface, and lateral flanks connecting said top and base surfaces to one another;
    a cutting edge formed at a transition of at least one said lateral flank to said top surface, said cutting edge having a convex profile in a plan view of said top surface, said cutting edge extending between cutting corners; and
    said cutting edge having a convex portion being convex in a side view of a flank, said convex portion being eccentrically located between said cutting corners, and concavely curved portions bounding said convex portion on both sides thereof, said concavely curved portions extending between ends of said convex portion and said cutting corners.

2. The cutting insert according to claim 1, wherein a transition from said convex portion into a first said concave portion and a transition from said convex portion into a second said concave portion are formed in each case tangentially.

3. The cutting insert according to claim 1, wherein a respective said cutting edge is formed at each transition from said lateral flanks to said top surface.

4. The cutting insert according to claim 1, wherein a radius of curvature of a concavely curved portion amounts to three to six times a radius of curvature of said convexly curved portion.

5. The cutting insert according to claim 1, wherein said profile of said cutting edge is formed by elliptical portions in a plan view of said top surface.

6. An arrangement, comprising: a tool holder and at least one cutting insert according to claim 1 mounted to said tool holder.

7. The arrangement according to claim 6, wherein said at least one cutting insert is arranged on said tool holder such that said convexly curved portion is located radially on an inside with regard to a trajectory of said cutting insert.

8. A cutting insert, comprising:
- a substantially triangular or square basic shape with a top surface, a base surface, and lateral flanks connecting said top and base surfaces to one another;
- a cutting edge formed at a transition of at least one said lateral flank to said top surface, said cutting edge extending between cutting corners; and
- said cutting edge having a convex portion being convex in a side view of a flank, and concavely curved portions bounding said convex portion on both sides thereof, said concavely curved portions extending between ends of said convex portion and said cutting corners;

said convexly curved portion being located eccentrically between said cutting corners, with a vertex of said convexly curved portion being shifted in a direction of said cutting corner that is located radially inside with regard to a trajectory of the cutting insert when the cutting insert is used.

9. A cutting insert, comprising:
- a substantially triangular or square basic shape with a top surface, a base surface, and lateral flanks connecting said top and base surfaces to one another;
- a cutting edge formed at a transition of at least one said lateral flank to said top surface, said cutting edge having a convex profile in a plan view of said top surface, said convex profile extending from a cutting corner to an adjacent cutting corner; and
- said cutting edge having a convex portion being convex in a side view of a flank, said convex portion being eccentrically located between said cutting corners, and concavely curved portions bounding said convex portion on both sides thereof, said concavely curved portions extending between ends of said convex portion and said cutting corners.

* * * * *